Patented Oct. 8, 1946

2,408,853

UNITED STATES PATENT OFFICE 2,408,853

GUAYULE RUBBER BY FERMENTATION

Samuel R. Hoover, Philadelphia, Pa., Paul J. Allen, Robles del Rio, Calif., and Joseph Naghski, Philadelphia, Pa., assignors to the United States of America as represented by the Secretary of Agriculture No Drawing. Application July 21, 1944, Serial No. 546,020

4 Claims. (Cl. 195—1)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

In the recovery of rubber from guayule by the conventional mechanical extraction method, the shrub is defoliated, crushed or cut, and milled with pebbles in a slurry containing appropriate solids until the rubber is agglomerated into granules, called worms. Upon dilution of the slurry with water, the worms float to the surface and are skimmed off. The product recovered by these operations is boiled, usually under hydrostatic pressure, to waterlog the particles of plant material contaminating it, and then is dried and marketed.

Commercial guayule rubber produced by this process contains appreciable quantities of resinous contaminants and plant debris. Various methods of further purifying the product have been proposed, extraction of the resins with acetone or other solvents having been employed commercially from time to time.

We have found that the rubber worms produced by the conventional mechanical extraction method can be subjected to a process of fermentation. By this method, only 5 to 20 percent of the plant mass material is required to be handled and pure culture inoculum may be employed to maintain an essentially pure culture fermentation. We have also developed a method for evaluating the ability of organisms to grow on and digest the guayule resins.

Guayule rubber worms are particles averaging $\frac{1}{16}''$ to $\frac{1}{4}''$ in size which on microscopic examination of cross sections are shown to be quite inhomogeneous, with numerous voids and occluded particles of bagasse. Apparently, the basic visible unit in a worm is the contents of one cell, many of these being pushed or stuck together to form a worm.

Evaluating the ability of organisms to grow on and digest guayule resins comprises inoculation and growth of a pure or mixed culture on an agar medium which contains the resin of guayule rubber as an emulsion, along with common bacterial nutrients, if the latter are desired. Resin digestion is shown by the appearance of cleared areas around the colonies as they grow. We have demonstrated that the microbiological digestion of the crude resin extracted from the rubber is a selective process, i. e. only certain constituents present in the resin are removed by the organisms. The data presented hereinafter shows that marked improvement in physical properties results from incubation of the rubber with these organisms, which leads to the conclusion that the impurities present in the rubber that are removed by fermentation are those which lower the physical properties.

A variety of organisms thus selected have been shown to improve the quality of guayule rubber by pure culture fermentation of the worms in an appropriate medium under proper conditions of aeration and temperature for the particular organism. Typical data is given in Table 1, below.

Examples 100 gms. wet weight of guayule worms were steam sterilized 30 minutes at 15-pound pressure, then fermented in 250–300 cc. of Allison's mineral salts medium [1] in 2-quart jars at 30–32° C. for 10 days. The pH was adjusted and organic amendments were added to the medium as indicated. The worms were washed and air dried at 32° C. Physical properties given are those at optimum time of cure, using the following formula and conditions, referred to as "ERRL Standard":

| | | |
|---|---|---|
| Rubber | parts | 100 |
| Captax | do | 1 |
| ZnO | do | 5 |
| Stearic acid | do | 1.5 |
| S | do | 3.5 |
| Mill T | °F | 115 |
| Vulc. T | °F | 274 |

[1] Standard Allison's medium was diluted to half strength.

All values are given at optimum time of cure for tensile strength.

Table 1

| Sample | Organism | Organic amend. | pH | Analytical results ||| Physical tests |||
|---|---|---|---|---|---|---|---|---|---|
| | | | | Benzene extract | Acetone extract | Benzene insol. | Tensile strength | Elongation | Hardness, Shore |
| U25W2-13 | Pseudomonas boreopolis | Nutrient broth | 7.1 | 76.28 | 17.79 | 5.93 | 2,960 | 830 | 32 |
| U25W2-5 | Micrococcus (unident.) | ___do___ | 7.0 | 76.65 | 17.43 | 5.92 | 2,650 | 950 | 31 |
| U25W2-16 | Achromobacter lacticum [1] | None | 6.3 | 76.03 | 17.75 | 6.22 | 2,280 | 970 | 27 |
| U25W2-18 | ___do___ | 0.2% NH₄ citrate | 6.7 | 77.49 | 17.21 | 5.30 | 2,810 | 880 | 32 |
| U25W3-1 | Aspergillus fumigatus | ___do___ | 7.4 | 78.87 | 16.74 | 4.39 | 2,860 | 840 | 35 |
| U25W3-7 | Aspergillus niger | ___do___ | 6.6 | 78.30 | 16.62 | 5.08 | 2,850 | 940 | 33 |
| U25W3-6 | Trichoderma sp. | ___do___ | 7.7 | 78.04 | 17.27 | 4.69 | 2,860 | 910 | 37 |
| U25W3-3 | Actinomyces fradii | ___do___ | 7.6 | 79.11 | 16.25 | 4.64 | 2,810 | 940 | 31 |
| U25W2-29 | Control | None | 7.0 | 75.34 | 19.06 | 5.60 | 2,230 | 940 | 27 |
| U25W2-30 | ___do___ | ___do___ | 6.8 | 75.49 | 18.75 | 5.79 | 2,350 | 940 | 32 |
| U25W3-14 | ___do___ | 0.2% NH₄ citrate | 6.7 | 75.47 | 18.80 | 5.73 | 2,540 | 950 | 29 |

[1] Less satisfactory growth took place in this medium. This data is given to typify the negative results obtained with unsatisfactory growth conditions or with organisms which do not produce the desired effect in any of the media tried.

On the basis of ease of culture and nutrient requirements *Pseudomonas boreopolis* gave the best results, as indicated by the following example: 1000 g. wet weight of worms were incubated without sterilization at room temperature (about 86–88° F.) in 5 liters of half strength Allison's solution to which was added 0.1% ammonium citrate and 0.15% K₂HPO₄. 100 cc. of a 2 day nutrient resin broth culture of *Ps. boreopolis* was added at 0 days and 100 cc. more of a 1 day culture was added the third day. Fermentation was carried out in an open crock and aeration was maintained by compressed air bubbling vigorously from a tube running to the bottom of the crock.

Table 2

| Day | Analytical composition ||| ERRL standard formula ||| Std.+0.5% p,p'-diaminodiphenyl methane |||
|---|---|---|---|---|---|---|---|---|---|
| | Benzene extract | Acetone extract | Benzene insoluble | Tensile | Modulus at 600% | Elong. | Tensile | Modulus at 600% | Elong. |
| | Per cent | Per cent | Per cent | P. s. i. | | Per cent | P. s. i. | | Per cent |
| Control | 75.45 | 18.20 | 6.35 | 2,400 | 270 | 940 | 3,120 | 630 | 840 |
| 5 | 77.77 | 16.28 | 5.95 | 2,860 | 440 | 890 | 3,380 | 1,070 | 800 |
| 8 | 78.75 | 14.61 | 6.64 | 3,020 | 500 | 880 | 3,450 | 1,120 | 800 |
| 12 | 80.31 | 13.87 | 5.82 | 3,060 | 430 | 900 | 3,710 | 1,190 | 790 |
| 20 | 80.99 | 12.45 | 6.56 | 3,280 | 660 | 860 | 3,790 | 1,080 | 800 |

The accelerating effect of p,p'-diaminodiphenyl methane upon the physical properties of the rubber was essentially additive upon the improvement due to the fermentation.

A boiling treatment or a heating under hydrostatic pressure (paila treatment) is conventionally used in the guayule rubber industry to waterlog the cellulosic debris present in the worms, thus causing it to sink and be separated from the floating rubber. The worms coming from this step of the process are at least partially sterilized and in excellent condition for a subsequent fermentation step. The worms treated by our process can be washed in water by a variety of means, such as on a screen or by successive changes of water, and then dried in the conventional manner.

Having thus described our invention, we claim:

1. The process of extracting high quality rubber from guayule rubber plants comprising mechanically separating rubber worms from the plant bulk, which worms will normally contain resinous contaminants, suspending the worms in water, selectively decomposing substantial portions of said resinous contaminants by fermentation, whereby the quality of the rubber is increased, thence removing and washing the resulting high quality rubber and drying it.

2. The process of producing an improved rubber from guayule rubber worms, comprising suspending the worms in water, inoculating the mixture with *Pseudomonas boreopolis* organisms, conditioning the medium for growth of the organisms, allowing the organisms to grow until the resin content of the worms is substantially decreased, whereby the physical properties of the rubber will be improved, then removing and washing the improved rubber and drying it.

3. The process of producing an improved rubber from guayule rubber worms, comprising suspending the worms in water, inoculating the mixture with *Aspergillus fumigatus* organisms, conditioning the medium for growth of the organisms, allowing the organisms to grow until the resin content of the worms is substantially decreased, whereby the physical properties of the rubber will be improved, then removing and washing the improved rubber and drying it.

4. The process of producing an improved rubber from guayule rubber worms, comprising suspending the worms in water, inoculating the mixture with *Trichoderma sp.* organisms, conditioning the medium for growth of the organisms, allowing the organisms to grow until the resin content of the worms is substantially decreased, whereby the physical properties of the rubber will be improved, then removing and washing the improved rubber and drying it.

SAMUEL R. HOOVER.
PAUL J. ALLEN.
JOSEPH NAGHSKI.